United States Patent [19]

Eynon et al.

[11] 3,763,709
[45] Oct. 9, 1973

[54] GYROSCOPE PRECESSING APPARATUS

[75] Inventors: George Thomas Eynon; Terry Shoesmith, both of Farnborough; Desmond Leonard Ernest Standen, Church Crookham, near Aldershot, all of England

[73] Assignee: The Secretary of State for Defense in Her Britannic Majesty's Government of the United Kingdom of Great Britain and Northern Ireland, London, England

[22] Filed: Feb. 7, 1972

[21] Appl. No.: 223,274

[30] Foreign Application Priority Data

Feb. 16, 1971  Great Britain ..................... 4,741/71

[52] U.S. Cl. .............................................. 74/5.47
[51] Int. Cl. ........................................... G01c 19/46
[58] Field of Search ................. 74/5.41, 5.42, 5.47, 74/5.44, 5.46

[56] References Cited
UNITED STATES PATENTS

| 2,992,563 | 7/1961 | Lassen ................................. 74/5.47 |
| 2,270,876 | 1/1942 | Esval et al. .......................... 74/5.46 |

FOREIGN PATENTS OR APPLICATIONS

| 547,208 | 8/1942 | Great Britain ....................... 74/5.41 |
| 846,879 | 8/1960 | Great Britain ....................... 74/5.41 |

*Primary Examiner*—Manuel A. Antonakas
*Attorney*—Stevens, Davis, Miller & Mosher

[57] ABSTRACT

Gyroscope precessing apparatus having a gyroscope mounted external to a gimbal system has gyroscope precessing forces applied to structure adjacent to a combined centre of inertia of the gyroscope and centre of rotation of the gimbal system. The forces are applied through a system of levers actuated by force motors, such as solenoids, capable of applying large forces. The geometry is such that precession of the gyroscope over its full range requires only small relative movements between parts of the force motors.

14 Claims, 4 Drawing Figures

GYROSCOPE PRECESSING APPARATUS

This invention relates to gyroscopically stabilised equipment of the type used in homing heads of guided missiles.

Gyroscopically stabilized equipment in general use tends to be very expensive, due to the need for minimal friction in the mountings, constant speed drive and, in the case of precessing equipment, the need for highly accurate and predictable gyroscope reaction to a known precessing signal. When used in guided missiles, which are used only once and are then in operation for only a short time such equipment is inordinately expensive, and there is a need for cheaper, if less accurate, equipment. For efficiency of a missile as a weapon, however, too much accuracy cannot be sacrificed.

One way of reducing the cost of a gyroscopically stabilized unit is by increasing the size of the rotor. This reduces the precision engineering required and also provides a rotor with high inertia. The latter result means that when used in missiles, with their short life, rotors can be run up to speed before firing and rely on their inertia to keep sufficient rotational speed without further power input during flight. However with large rotors, in order to keep overall equipment size down, the rotors must be mounted external to their gimbals. Precession inputs, required, for example, to maintain a gyroscopically stabilised homing head centred on a target, must be applied to the rotor via a non-rotating part of its mounting, and simple means of applying these inputs tend to be associated with high friction. The rotor reacts to these friction forces, and to the friction forces due to movement of the gimbals, and this reaction can in extreme cases ruin the efficiency of a missile as a weapon.

This invention provides cheap, simple gyroscopically stabilised equipment having simple precessing means which keep the inaccuracies due to friction within acceptable limits.

According to the invention a gyroscope includes a rotor formed with an integral central housing, gimbals within the housing carrying a spigot on which the rotor is rotatably mounted, and means for applying a precessing force, through the spigot, at a point a distance from the centre of rotation of the gimbals proportional to the required characteristics of the force.

In a preferred embodiment of the invention the spigot is rigidly mounted on a gimbal member and has an extension beyond the centre of rotation of the gimbals, the point of application of the precessing force being situated on this extension. Preferably the precessing forces are supplied by force motors such as solenoids, acting through a system of levers on a point adjacent the centre of rotation of the gimbals. As they act over short distances the precessing forces must be large, but the motions of the activating units are small. The precessing forces thus swamp friction effects arising in the activating unit and in the gimbals.

One embodiment of the invention will now be described, by way of example only, with reference to the accompanying drawings, of which:

Figure 4:
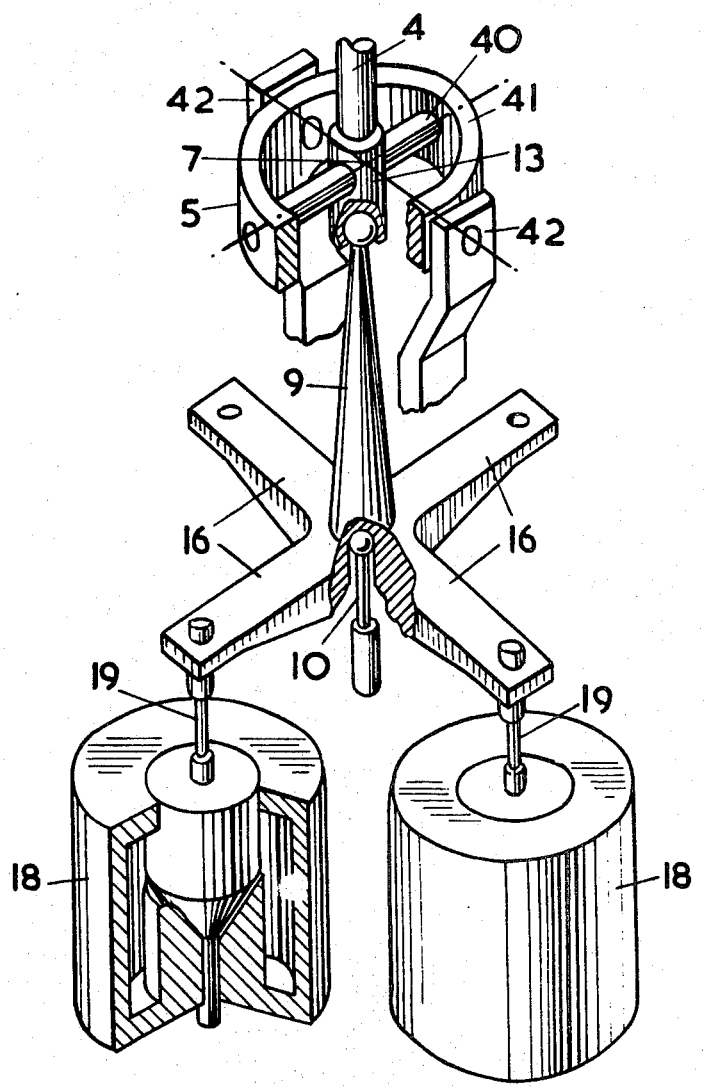

A rotor 1 (FIG. 1) is rotatable, under the influence of pneumatic pressure applied to buckets such as that shown at 2, on bearings 3 at one end 14 of a spigot 4. The other end 13 of the spigot 4 is rigidly mounted on the cross member 40 (see FIG. 4) of a gimbal system 5.

Figure 1:
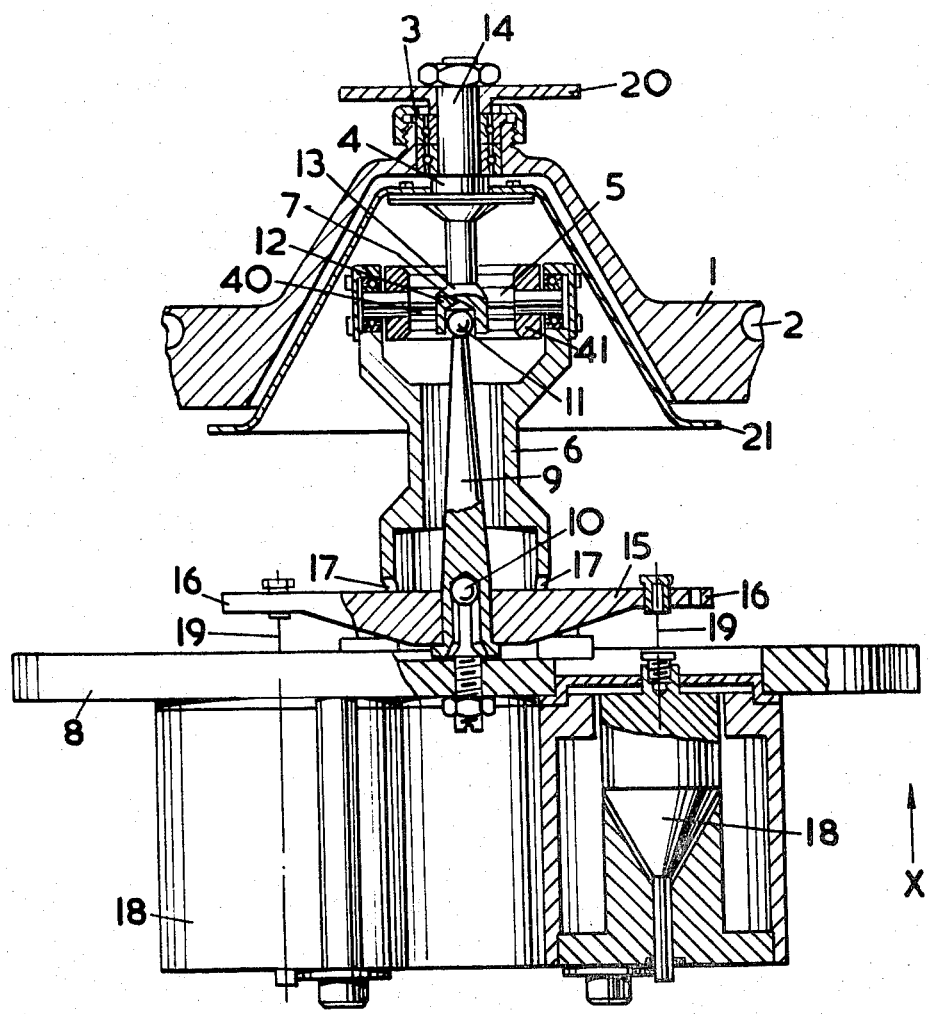
FIG. 1 is a side elevation, partly in section, of a precessionable gyroscope.
Figure 2:
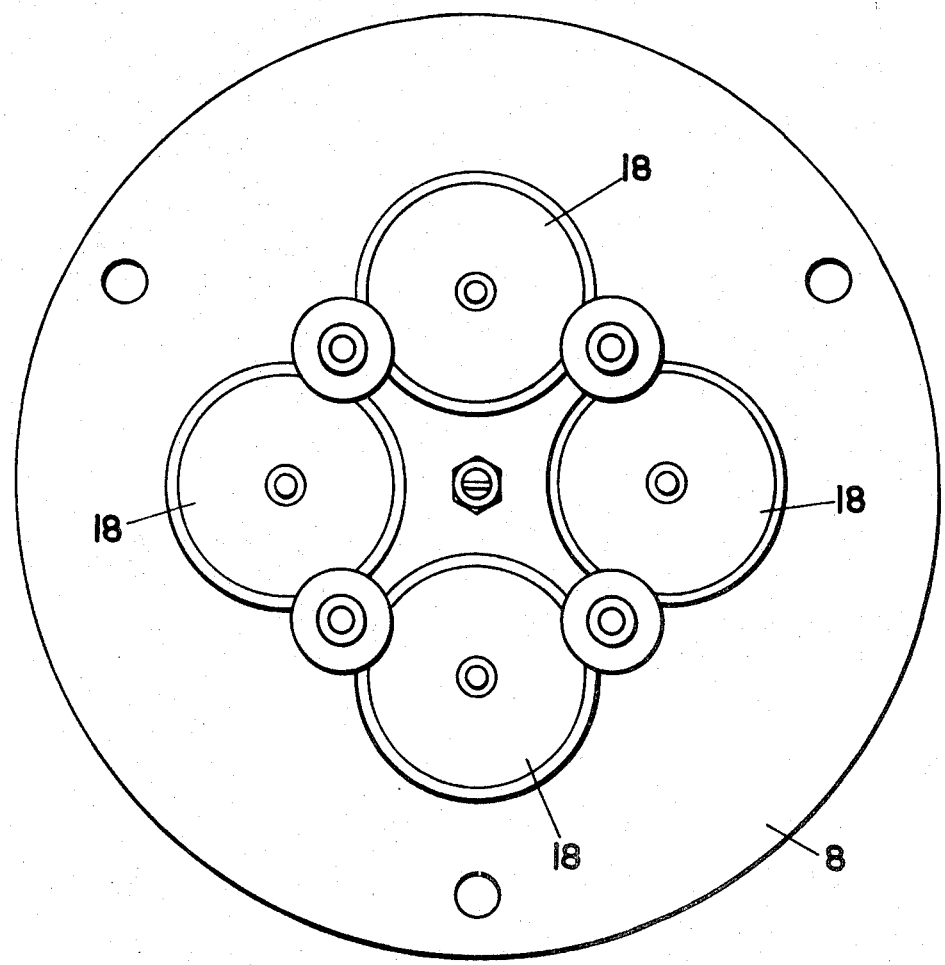
FIG. 2 is an end view taken in the direction of arrow X on FIG. 1.
Figure 3:
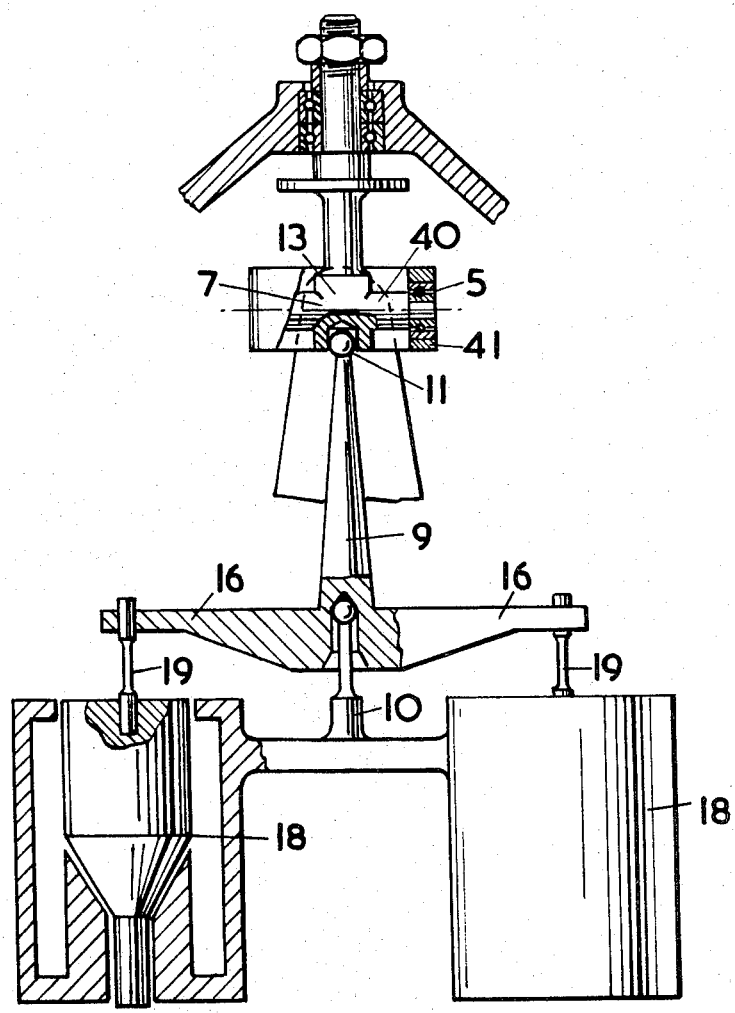
FIG. 3 is a side elevation, partly in section, showing in more detail some of the items shown in FIG. 1, and, FIG. 4 is a third angle projection, partly in section, of some elements of the unit.

The gimbal system 5 (FIG. 4) has the cross member 40 rotatable in a gimbal ring 41 which is rotatably mounted, on an axis at right angles to the axis of the cross member 40, on two arms 42 which extend from a hollow cylindrical support 6 (FIG. 1). The rotor is so shaped and disposed that its centre of inertia coincides with the intersection point of the rotational axis of the cross member 40 and gimbal ring 41, which lie in the same plane. The coincident centre is shown at 7 in FIGS. 1 and 3. The end 13 of the spigot 4 projects some distance beyond the cross member 40, the projection 12 being in the form of a hollow cylinder.

The support 6 is rigidly fixed to a supporting structure 8. A pivot in the form of a ball bearing 10 is situated at the extremity of a rod which projects from the structure 8 along the axis of the support 6. A control arm 9 mounted on the bearing 10 passes through the support 6 and terminates in a ball end 11 which lies within and bears against the inner circumference of the projection 12 of the spigot 4. The distance between the circumference of contact and the coincident centres 7 is small compared with the dimensions of the gimbal system 5, and is exaggerated in FIGS. 3 and 4. In practice the distance will be determined by the physical and geometrical characteristics of a particular gyroscope and by the required precession rates.

The base of the control arm 9 is secured to a spider 15 having four arms 16 which project through holes 17 in the support 6. The spider 15 and control arm 9 are so proportioned that the assembly 9, 15 is in balance about the ball end of the bearing 10.

Four solenoids 18 mounted on the supporting structure 8 have their armatures connected one to each of the arms 16 by links 19.

Mounted on the spigot 4 are a platform 20 and a gyroscope backing plate 21, and equipment (not shown) such as an infra-red, laser or radar eye may be mounted on the platform 20. The weights of these items must be such that the centre of gravity of the spigot 4 and all it carries lies at the co-incident centre 7.

In operation, inputs to the solenoids 18 are transmitted via the links 19, spider arms 16 and control rod 9 to the spigot 4, and cause the rotor 1 to precess. It will be appreciated that although movements of the solenoid armatures will be small, very high precessing forces can be applied. Frictional forces will therefore be swamped.

The solenoid assembly may be controlled by any desired system. Although four solenoids are used in the above example, more or less may be used, depending on the intended use of the unit and on the controlling system.

When installed in a guided missile the gyroscope mounting will be caged relative to the missile. Caging might be effected by, for example, withdrawable clamping arms which engage the backing plate 21. Upon initiation of the missile firing sequence pneumatic pressure is applied to the buckets 2 from a supply (not shown) which might comprise one or more nozzles secured to the missile structure or to the supporting structure 8. When the gyroscope 1 is rotating at the required speed the clamping arms are withdrawn and at this stage the pneumatic supply must be discontinued to prevent pressure from acting directly on the gyroscope 1, when displaced, and giving rise to undesirable precessing forces.

Missile flight times will usually be of short enough duration for the gyroscope inertia to maintain adequate rotational speed.

An alternative type of pneumatic supply uses at least one nozzle secured to the backing plate 21 and supplied through flexible piping. Such a supply might be in place of or in addition to a fixed supply, and enables effective gyroscope control to be maintained for longer missile flight times.

Signals from equipment mounted on the platform 20 can be fed back along flexible wiring which passes through the spigot 4 and around the gimbal system 5.

Effects due to friction and compliancy caused by the signal wiring and by flexible pneumatic piping, if used, will be minimised by the high precessing forces used.

What we claim is:

1. A gyroscopically stabilised unit comprising a gimbal system mounted on a base; a spigot carried by the gimbal system; a rotor formed with an integral central housing rotatably mounted on the spigot with its centre of inertia coincident with the centre of rotation of the gimbal system; structure also carried by the gimbal system and rigidly connected to the spigot; and means for applying forces to the structure at a point adjacent to the coincident centres, said means comprising a control rod which engages the structure at said point by way of a ball and socket arrangement, said control rod being rigidly mounted on and normal to a spider, the control rod and spider assembly being rotatable about a pivot positioned along the centre line of the control rod and secured to the base, the spider having a plurality of arms each of which has a force motor connected thereto.

2. A unit as claimed in claim 1 wherein the centre of gravity of the control rod and spider assembly coincides with the pivot.

3. A unit as claimed in claim 2 wherein the spider has four symmetrically disposed arms.

4. A unit as claimed in claim 3 wherein a gyroscope backing plate is secured to the spigot between the rotor and the gimbal system, and a platform is secured to the spigot on the side of the rotor remote from the backing plate.

5. A unit as claimed in claim 4 wherein the centre of gravity of the spigot and the rotor, backing plate and platform carried on the spigot coincide with the centre of rotation of the gimbal system.

6. A unit as claimed in claim 1 wherein the gimbal system comprises a gimbal ring rotatably mounted on a support secured to the base, the gimbal ring having a diagonal cross-member rotatable about an axis at right angles to the axis of rotation of the gimbal ring.

7. A unit as claimed in claim 6 wherein the spigot is rigidly mounted on the cross-member and has an extension which forms said structure.

8. A unit as claimed in claim 7 wherein said means comprise a control rod which engages the extension at said point by way of a ball and socket arrangement, the control rod being actuable by at least two force motors.

9. A unit as claimed in claim 8 wherein the control rod is rigidly mounted on and normal to a spider, the control rod and spider assembly being rotatable about a pivot positioned along the centre-line of the control rod and secured to the base, the spider having a plurality of arms each of which has a force motor connected thereto.

10. A unit as claimed in claim 9 wherein the centre of gravity of the control rod and spider assembly coincides with the pivot.

11. A unit as claimed in claim 10 wherein the spider has four symmetrically disposed arms.

12. A unit as claimed in claim 11 wherein a gyroscope backing plate is secured to the spigot between the rotor and the gimbal system, and a platform is secured to the spigot on the side of the rotor remote from the backing plate.

13. A unit as claimed in claim 12 wherein the centre of gravity of the spigot and the rotor, backing plate and platform carried on the spigot coincide with the centre of rotation of the gimbal system.

14. A guided missile comprising a casing and directional control means; a base plate secured to the casing, a gimbal system mounted on a support secured to the base plate, a spigot carried by the gimbal system, a rotor rotatably mounted on the spigot with its centre of inertia coincident with the centre of rotation of the gimbal system, a backing plate secured to the spigot between the rotor and the gimbal system and a platform secured to the spigot on the side of the rotor remote from the backing plate, the centre of gravity of the spigot and the rotor, backing plate and platform mounted on the spigot coinciding with the centre of rotation of the gimbal system;

structure carried by the gimbal system rigidly connected to the spigot;

a control rod rigidly mounted on and normal to a spider, the control rod and spider assembly being rotatable about a pivot positioned along the centre line of the control rod and secured to the base plate, the centre of gravity of the assembly coinciding with the pivot, the spider having a plurality of arms to each of which is connected a force motor and the control rod engaging said structure by means of a ball and socket arrangement at a point adjacent the centre of rotation of the gimbal system;

and means to convey signals to the force motors and to the directional control means from the platform.

* * * * *